(12) United States Patent
Hsu et al.

(10) Patent No.: US 12,454,455 B2
(45) Date of Patent: Oct. 28, 2025

(54) SEMICONDUCTOR STRUCTURE AND METHOD OF MAKING

(71) Applicant: TAIWAN SEMICONDUCTOR MANUFACTURING COMPANY LIMITED, Hsin-Chu (TW)

(72) Inventors: Hsi-Cheng Hsu, Taichung (TW); Chen-Wei Chiang, Hsinchu (TW); Jui-Chun Weng, Taipei (TW); Hsin-Yu Chen, Hsinchu (TW); Chia Yu Lin, Taoyuan (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 588 days.

(21) Appl. No.: 17/884,106

(22) Filed: Aug. 9, 2022

(65) Prior Publication Data
US 2024/0051818 A1 Feb. 15, 2024

(51) Int. Cl.
| | |
|---|---|
| *B81B 7/02* | (2006.01) |
| *B81B 3/00* | (2006.01) |
| *B81C 1/00* | (2006.01) |

(52) U.S. Cl.
CPC .......... *B81B 7/02* (2013.01); *B81C 1/00269* (2013.01); *B81B 2201/0264* (2013.01); *B81C 2203/0109* (2013.01)

(58) Field of Classification Search
CPC ...... B81B 7/02; B81B 7/04; B81C 2203/0109
See application file for complete search history.

(56) References Cited

U.S. PATENT DOCUMENTS

2017/0217756 A1* 8/2017 Hsieh .................... B81B 3/0005
2018/0230001 A1* 8/2018 Chang ................. B81C 1/00912

* cited by examiner

*Primary Examiner* — Joshua Benitez Rosario
*Assistant Examiner* — Jacob T Nelson
(74) *Attorney, Agent, or Firm* — Cooper Legal Group, LLC

(57) ABSTRACT

In some embodiments, a semiconductor device is provided. The semiconductor device includes a semiconductor layer, a micro-electromechanical systems (MEMS) structure defined in the semiconductor layer, a bond ring over the semiconductor layer, and a cap structure over the MEMS structure and bonded to the bond ring. The MEMS structure has an upper surface and the cap structure has a lower surface facing the upper surface of the MEMS structure. Dimples of eutectic material are on the upper surface of the MEMS structure.

20 Claims, 7 Drawing Sheets

SEMICONDUCTOR STRUCTURE AND METHOD OF MAKING

BACKGROUND

Micro-electromechanical systems (MEMS) combine mechanical and electronic components on a semiconductor structure. A MEMS structure can be used as a sensor, such as a pressure sensor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
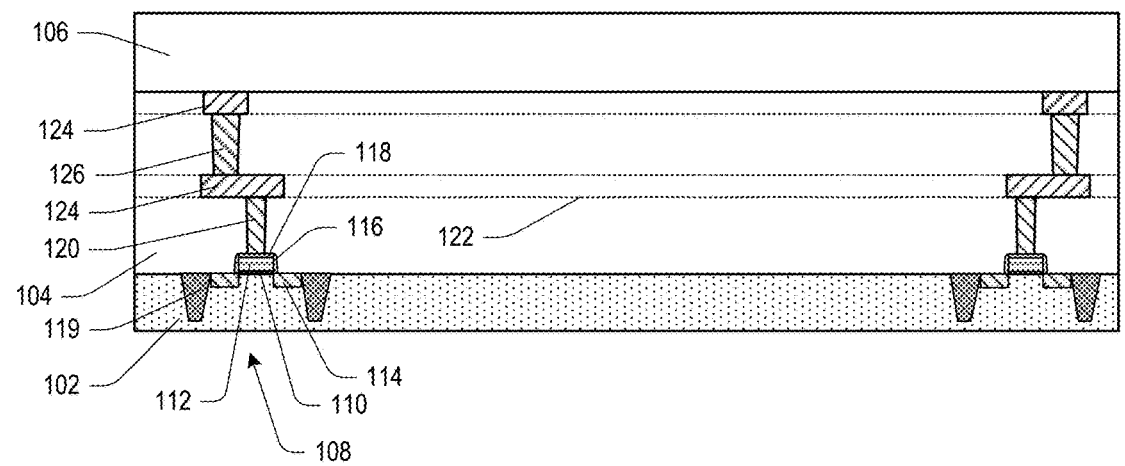
FIGS. 1-7 illustrate a semiconductor device at a stage of fabrication, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

According to some embodiments, a microelectromechanical systems (MEMS) device is formed. The MEMS device is covered by a cap structure that creates a sealed cavity surrounding the MEMS device. Dimples are formed on upper surfaces of movable elements of the MEMS device. The dimples may be formed of a eutectic material that is also used for forming a bond ring that is bonded to the cap structure. In some embodiments, an etch process for forming the bond ring is controlled so that eutectic material redeposits on the upper surfaces of the movable elements to form the dimples. The dimples increase the surface roughness of the upper surface of the movable elements. If the movement of a movable element is sufficient to cause the movable element to contact the lower surface of the cap structure, the dimples perform an anti-stiction function and reduce the likelihood that the movable element will adhere to the cap structure and potentially damage the MEMS device.

FIGS. 1-11 illustrate a semiconductor structure 100 at various stages of fabrication, in accordance with some embodiments. FIGS. 1-11 illustrate cross-section views of the semiconductor structure 100 at various stages of fabrication. In some embodiments, the semiconductor structure 100 is a MEMS device. The semiconductor structure 100 includes a substrate layer 102, an interlayer dielectric layer 104 over the substrate layer 102, and a bonding dielectric layer 106 over the interlayer dielectric layer 104. In some embodiments, the bonding dielectric layer 106 comprises silicon dioxide. The bonding dielectric layer 106 provides an interface for bonding another semiconductor wafer.

The substrate layer 102 comprises at least one of an epitaxial layer, a single crystalline semiconductor material such as, but not limited to at least one of Si, Ge, SiGe, InGaAs, GaAs, InSb, GaP, GaSb, InAlAs, GaSbP, GaAsSb, and InP, a silicon-on-insulator (SOI) structure, a wafer, or a die formed from a wafer. In some embodiments, the substrate layer 102 comprises at least one of crystalline silicon or other suitable materials. The substrate layer 102 may be a silicon-on-insulator (SOI) substrate comprising a layer of a semiconductor material (e.g., silicon, germanium and the like) formed over an insulator layer (e.g., buried oxide and the like), which is formed in a silicon substrate. Other substrates that may be used include multi-layered substrates, gradient substrates, hybrid orientation substrates, the like, or a combination thereof. Other structures and/or configurations of the substrate layer 102 are within the scope of the present disclosure.

According to some embodiments, the semiconductor structure 100 comprises devices 108 formed on or within the substrate layer 102. In some embodiments, the devices 108 each comprise a gate dielectric layer 110 a gate electrode 112, source/drain regions 114, a sidewall spacer 116, a gate cap layer 118, etc. According to some embodiments, the gate dielectric layer 110, and the gate electrode 112 are formed using a gate replacement process. A sacrificial gate structure comprising a sacrificial gate dielectric layer, a sacrificial gate electrode layer, such as a polysilicon layer, and a hard mask layer are formed. In some embodiments, a patterning process is performed to pattern the hard mask layer corresponding to a pattern of gate structures to be formed, and an etch process is performed using the patterned hard mask layer to etch the sacrificial gate electrode layer and the sacrificial gate dielectric layer to define the sacrificial gate structure. In some embodiments, remaining portions of the hard mask layer form a cap layer over the portions of the sacrificial gate electrode layer remaining after the etch process. The sacrificial gate structure is later replaced with a replacement gate dielectric layer, such as the gate dielectric layer 110 and a replacement gate electrode, such as the gate electrode 112.

In some embodiments, the gate dielectric layer 110 comprises a high-k dielectric material. As used herein, the term "high-k dielectric" refers to the material having a dielectric constant, k, greater than or equal to about 3.9, which is the k value of $SiO_2$. The high-k dielectric material may be any suitable material. Examples of the high-k dielectric material include but are not limited to $Al_2O_3$, $HfO_2$, $ZrO_2$, $La_2O_3$, $TiO_2$, $SrTiO_3$, $LaAlO_3$, $Y_2O_3$, $Al_2O_xN_y$, $HfO_xN_y$, $ZrO_xN_y$, $La_2O_xN_y$, $TiO_xN_y$, $SrTiO_xN_y$, $LaAlO_xN_y$, $Y_2O_xN_y$, SiON, $SiN_x$, a silicate thereof, and an alloy thereof. Each value of x is independently from 0.5 to 3, and each value of y is independently from 0 to 2. In some embodiments, the gate dielectric layer 110 comprises a native oxide layer formed by exposure of the semiconductor structure 100 to oxygen at various points in the process flow, causing the formation of silicon dioxide on exposed surfaces of the substrate layer 102. In some embodiments, an additional layer of dielectric material, such as silicon dioxide, a high-k dielectric material, or other suitable material, is formed over the native oxide to form the gate dielectric layer 110.

In some embodiments, the gate electrode 112 comprises a barrier layer, one or more work function material layers, a seed layer, a metal fill layer, or other suitable layers. In some embodiments, the metal fill layer comprises tungsten, aluminum, copper, cobalt, or other suitable material. In some embodiments, the gate dielectric layer 110 and the one or more layers that comprise the gate electrode 112 are deposited by at least one of atomic layer deposition (ALD), physical vapor deposition (PVD), chemical vapor deposition (CVD), low pressure chemical vapor deposition (LPCVD), plasma enhanced chemical vapor deposition (PECVD), atomic layer chemical vapor deposition (ALCVD), ultrahigh vacuum chemical vapor deposition (UHVCVD), reduced pressure chemical vapor deposition (RPCVD), molecular beam epitaxy (MBE), or other suitable techniques. In some embodiments, the gate electrode 112 is recessed and the gate cap layer 118 is formed in the recess.

In some embodiments, the sidewall spacer 116 is formed adjacent the gate dielectric layer 110 and the gate electrode 112. In some embodiments, the sidewall spacer 116 is formed by depositing a spacer layer over the sacrificial gate structure and performing an anisotropic etch process to remove horizontal portions of the spacer layer. In some embodiments, the sidewall spacer 116 comprises silicon nitride or other suitable materials.

In some embodiments, the source/drain regions 114 are formed in the substrate layer 102 after forming the sacrificial gate structure. For example, in some embodiments, portions of the substrate layer 102 are doped through an implantation process to form the source/drain regions 114. In some embodiments, an etch process is performed to recess the substrate layer 102 adjacent the sidewall spacer 116, and an epitaxial growth process is performed to form the source/drain regions 114.

In an embodiment, one or more shallow trench isolation (STI) structures 119 are formed within the substrate layer 102. In some embodiments, the STI structures 119 are formed by forming at least one mask layer over the substrate layer 102. In some embodiments, the at least one mask layer comprises a layer of oxide material over the substrate layer 102 and a layer of nitride material over the layer of oxide material, and/or one or more other suitable layers. At least some of the at least one mask layer is removed to define an etch mask for use as a template to etch the substrate layer 102 to form trenches. A dielectric material is formed in the trenches to define the STI structures 119. In some embodiments, the STI structures 119 include multiple layers, such as an oxide liner, a nitride liner formed over the oxide liner, an oxide fill material formed over the nitride liner, and/or other suitable materials.

In some embodiments, a fill material, such as the oxide fill material, is formed using a high density (HDP) plasma process. The HDP process uses precursor gases comprising at least one of silane ($SiH_4$), oxygen, argon, or other suitable gases. The HDP process includes a deposition component, which forms material on surfaces defining the trench, and a sputtering component, which removes or relocates deposited material. A deposition-to-sputtering ratio depends on gas ratios employed during the deposition component. According to some embodiments, argon and oxygen act as sputtering sources, and the particular values of the gas ratios are determined based on an aspect ratio of the trench. After forming the fill material, an anneal process is performed to densify the fill material. In some embodiments, the STI structures 119 generate compressive stress.

Although the substrate layer 102 and the STI structures 119 are illustrated as having coplanar upper surfaces at an interface where the substrate layer 102 abuts the STI structures 119, the relative heights can vary. For example, the STI structures 119 can be recessed relative to the substrate layer 102 or the substrate layer 102 can be recessed relative to the STI structures 119. The relative heights at the interface depend on the processes performed for forming the STI structures 119, such as at least one of deposition, planarization, mask removal, surface treatment, or other suitable techniques. In some embodiments, the STI structures 119 are formed prior to forming the devices 108. Other structures and/or configurations of the STI structures 119 are within the scope of the present disclosure.

In some embodiments, the devices 108 are formed using the same materials and layer thicknesses. In some embodiments, different materials and/or thicknesses may be used due to the different voltage domains. For example, the material and/or thickness of the gate dielectric layers 110 may differ from one another. Although the devices 108 are illustrated as being adjacent one other, in some embodiments, the devices 108 are formed in different regions. For example, if the gate dielectric layers 110 vary in thickness or material, the differing devices 108 may be formed in different regions. In some embodiments, the materials of the gate electrode 112 may also differ. Other structures and configurations of the devices 108 are within the scope of the present disclosure. For example, the devices 108 may be fin field-effect transistor (finFET) devices, nanosheet devices, nanowire devices, or some other suitable device.

In some embodiments, a portion of the interlayer dielectric layer 104 is formed over the devices 108. In some embodiments, the interlayer dielectric layer 104 is formed prior to forming the replacement gate structures, if applicable. In some embodiments, the interlayer dielectric layer 104 comprises silicon dioxide or a low-k dielectric material. In some embodiments, the interlayer dielectric layer 104 comprises one or more layers of low-k dielectric material. Low-k dielectric materials have a k value lower than about 3.9. In some embodiments, the material for the interlayer dielectric layer 104 comprise at least one of Si, O, C, or H, such as SiCOH, SiOC, oxygen-doped SiC (ODC), nitrogen-doped SiC (NDC), plasma-enhanced oxide (PEOX), or other suitable materials. A low-k dielectric material is, in some embodiments, further characterized or classified as ultra low-k (ULK), extra low-k (ELK), or extreme low-k (XLK), where the classification is generally based upon the k value. For example, ULK generally refers to materials with a k value of between about 2.7 to about 2.4, ELK generally refers to materials with a k value of between about 2.3 to about 2.0, and XLK generally refers to materials with a k value of less than about 2.0. Organic material, such as polymers, may be used for the interlayer dielectric layer 104. In some embodiments, the interlayer dielectric layer 104 comprises one or more layers of a carbon-containing material, organo-silicate glass, a porogen-containing material, or combinations thereof. The interlayer dielectric layer 104 comprises nitrogen in some embodiments. In some embodiments, the interlayer dielectric layer 104 is formed by using, for example, at least one of CVD, PECVD, LPCVD, ALCVD, a spin-on technology, or some other suitable process.

In some embodiments, the semiconductor structure 100 comprises one or more conductive contacts 120 formed in the interlayer dielectric layer 104. The conductive contacts 120 are formed in any number of ways, such as by a single damascene process, a dual damascene process, a trench silicide process, or some other suitable process. In some embodiments, the conductive contacts 120 contact the gate electrodes 112 and additional contacts (not shown) are formed to contact the source/drain regions 114 in different positions along the axial lengths of the devices 108, such as into or out of the page. In some embodiments, the conductive contacts 120 comprise a barrier layer, a seed layer, a metal fill layer, or other suitable layers. In some embodiments, the metal fill layer comprises tungsten, aluminum, copper, cobalt, or other suitable material. In some embodiments, the devices 108, the conductive contacts 120, and the interlayer dielectric layer 104 define a device layer of the semiconductor structure 100. Other structures and configurations of the conductive contacts 120 are within the scope of the present disclosure.

In some embodiments, the semiconductor structure 100 comprises one or more metallization layers in the interlayer dielectric layer 104 over the device layer. Any number of metallization dielectric layers are contemplated. In some embodiments, different metallization layers are separated by etch stop layers 122 to allow etch control for forming various conductive structures 124, 126 in the interlayer dielectric layer 104. The etch stop layers 122 comprise a dielectric material having a different etch selectivity from the interlayer dielectric layer 104. In some embodiments, at least one of the etch stop layers 122 comprises SiN, SiCN, SiCO, CN, etc., alone or in combination. The etch stop layers 122 are formed in any number of ways, such as by thermal growth, chemical growth, ALD, CVD, PECVD, or some other suitable process.

The conductive structures extend through their respective portions of the interlayer dielectric layer 104 in the associated metallization layer. In some embodiments, some of the conductive structures 124 comprise conductive lines and the conductive structures 126 comprise conductive vias. In some embodiments, the conductive structures 124, 126 comprise a barrier layer, a seed layer, a metal fill layer, or other suitable layers. In some embodiments, the metal fill layer comprises tungsten, aluminum, copper, cobalt, or other suitable material. Other structures and configurations of the conductive structures 124, 126 are within the scope of the present disclosure.

In some embodiments, the devices 108 are portions of a circuit implemented by the semiconductor structure 100. In some embodiments, the circuit comprises a sensor circuit comprising at least one of an image sensor, a complementary metal-oxide-semiconductor (CMOS) image sensor (CIS), a backside CIS, a proximity sensor, a time of flight (ToF) sensor, an indirect ToF (iToF) sensor, a backside illumination (BSI) sensor, or other type of sensor. In some embodiments, the circuit comprises a logic circuit, a light-emitting diode (LED) circuit, a liquid-crystal display (LCD) circuit, a random access memory (RAM) circuit, or other type of circuit. Other structures and/or configurations of the semiconductor structure 100 are within the scope of the present disclosure.

Figure 2:
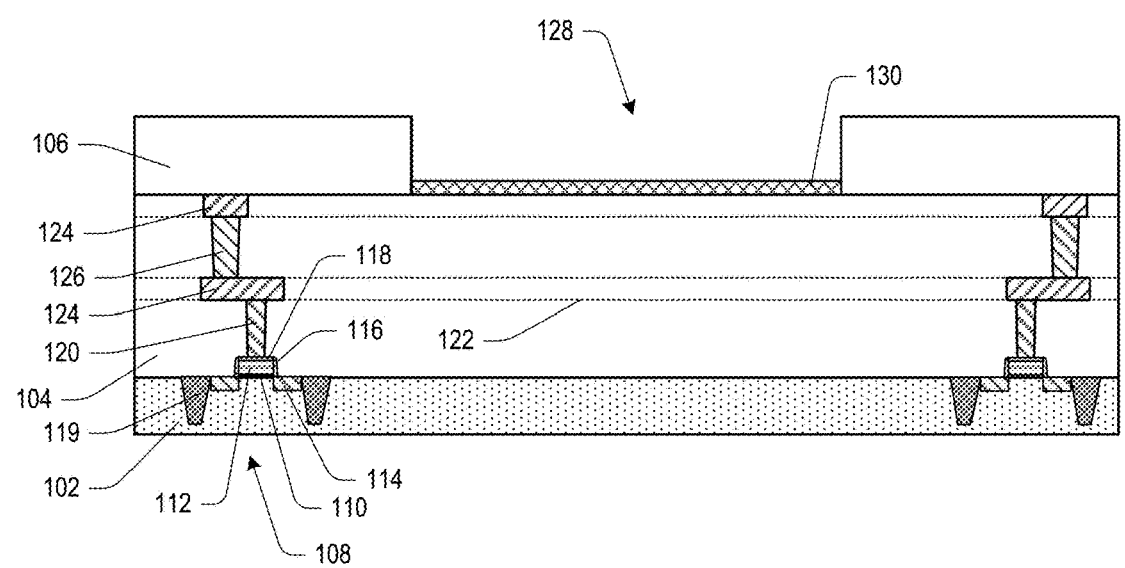

Referring to FIG. 2, a cavity 128 is formed in the bonding dielectric layer 106 and a conductive layer 130 is formed in the cavity 128, in accordance with some embodiments. A portion of the bonding dielectric layer 106 is removed to form the cavity 128. According to some embodiments, the cavity 128 is formed using a photoresist (not shown). The photoresist is formed over the bonding dielectric layer 106 by at least one of PVD, sputtering, CVD, PECVD, LPCVD, ALCVD, UHVCVD, RPCVD, ALD, molecular beam epitaxy (MBE), liquid phase epitaxy (LPE), spin on, growth, or other suitable techniques. The photoresist comprises a light-sensitive material, where properties, such as solubility, of the photoresist are affected by light. The photoresist is a negative photoresist or a positive photoresist. With respect to a negative photoresist, regions of the negative photoresist become insoluble when illuminated by a light source, such that application of a solvent to the negative photoresist during a subsequent development stage removes non-illuminated regions of the negative photoresist. A pattern formed in the negative photoresist is thus a negative image of a pattern defined by opaque regions of a template, such as a mask, between the light source and the negative photoresist. In a positive photoresist, illuminated regions of the positive photoresist become soluble and are removed via application of a solvent during development. Thus, a pattern formed in the positive photoresist is a positive image of opaque regions of the template, such as a mask, between the light source and the positive photoresist.

In some embodiments, an etching process is performed to remove a portion of the bonding dielectric layer 106 to form the cavity 128, where an opening in the photoresist allows one or more etchants applied during the etching process to remove the portion of the bonding dielectric layer 106 to form the cavity 128 while the photoresist protects or shields portions of the bonding dielectric layer 106 that are covered by the photoresist. The etching process is at least one of a dry etching process, a wet etching process, an anisotropic etching process, an isotropic etching process, or other suitable etching process. The etching process uses at least one of fluorine, hydrogen fluoride (HF), diluted HF, sulfur hexafluoride ($SF_6$), a chlorine compound such as hydrogen chloride ($HCl_2$), hydrogen sulfide ($H_{2S}$), tetrafluoromethane ($CF_4$), or other suitable material. The photoresist is stripped or washed away after the cavity 128 is formed. Other processes and/or techniques for forming the cavity 128 are within the scope of the present disclosure.

The conductive layer 130 is formed in the cavity 128, at least on the bottom surface of the cavity 128. In some embodiments, a layer of conductive material is formed over the bonding dielectric layer 106 and in the cavity 128 and a patterned etch process is performed to remove portions of the layer of conductive material outside the cavity 128. The conductive layer 130 may comprise tungsten, aluminum, copper, cobalt, or other suitable material.

Figure 3:
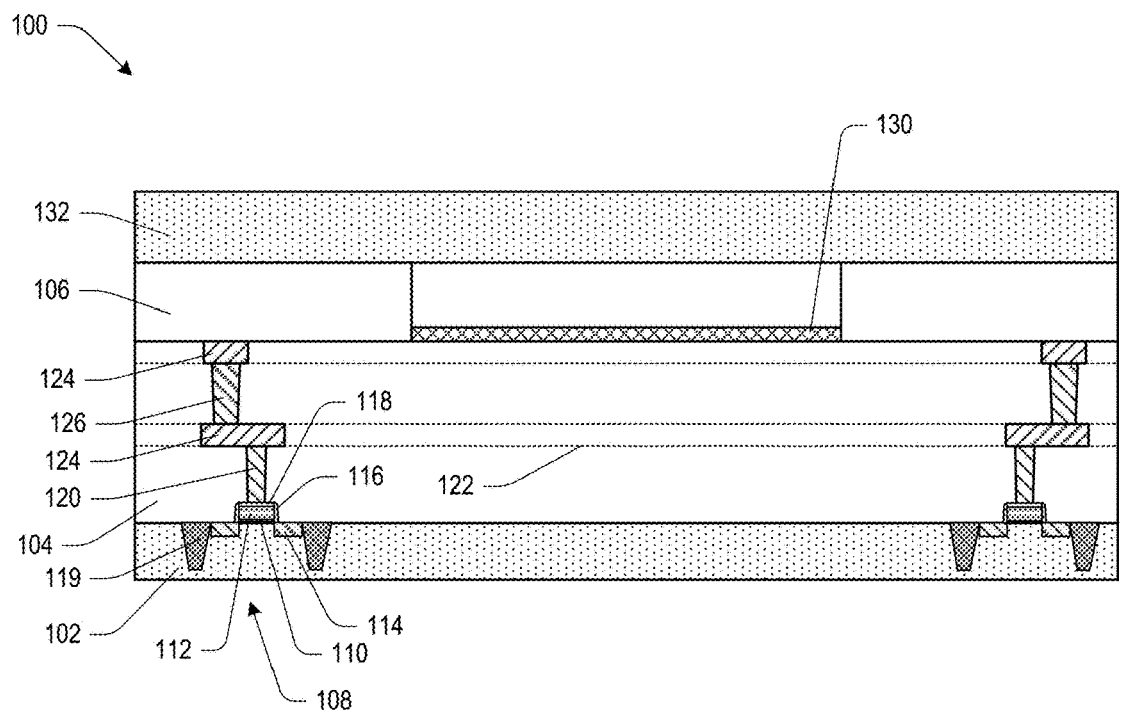

Referring to FIG. 3, a semiconductor layer 132 is formed over the bonding dielectric layer 106, in accordance with some embodiments. The semiconductor layer 132 may be a portion of a semiconductor wafer that is bonded to the bonding dielectric layer 106, for example, using a wafer bonding process, such as a fusion bonding process. The semiconductor layer 132 may comprise silicon or other suitable materials.

Figure 4:
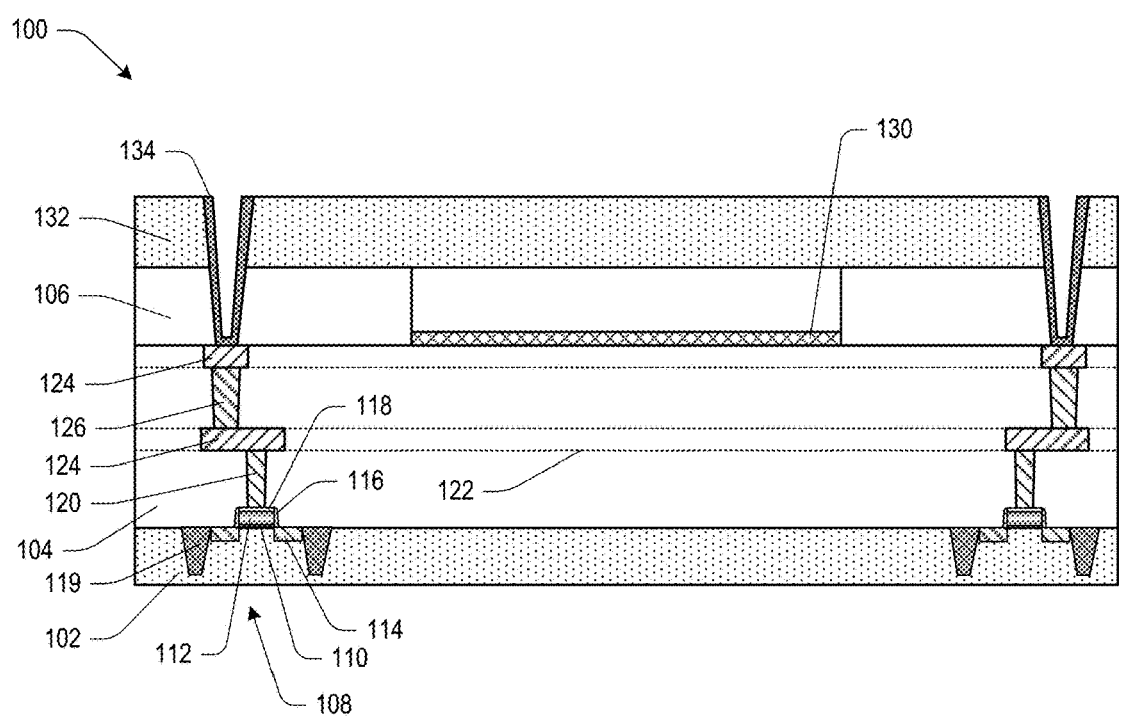

Referring to FIG. 4, conductive contacts 134 are formed in the semiconductor layer 132 and the bonding dielectric layer 106, in accordance with some embodiments. In some embodiments, the conductive contacts 134 may be formed by forming contact openings in the semiconductor layer 132 and the bonding dielectric layer 106 and forming a conductive material in the contact openings. In some embodiments, a masked etch process is performed to form the contact openings and one or more deposition processes are performed to at least partially fill the contact openings. In some embodiments, the conductive material comprises tungsten, aluminum, copper, cobalt, or other suitable material.

Figure 5:
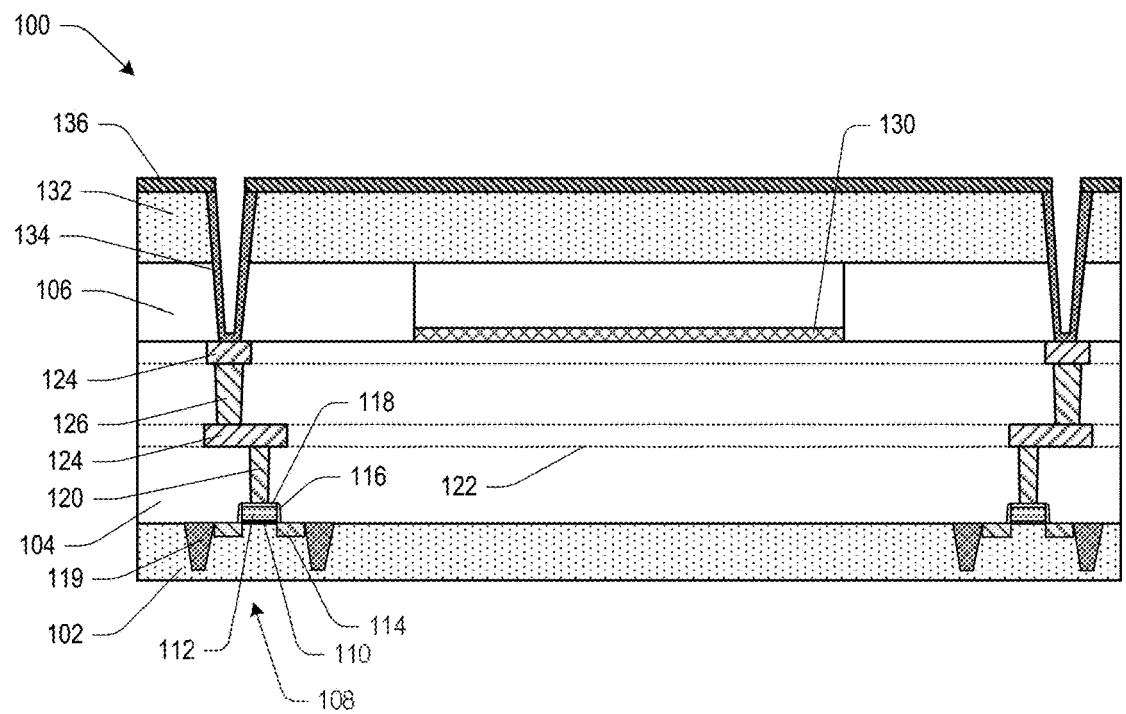

Referring to FIG. 5, a bond pad layer 136 is formed over the semiconductor layer 132, in accordance with some embodiments. A portion of the bond pad layer 136 may extend into the contact openings in which the conductive contacts 134 are formed if the conductive contacts 134 do not completely fill the contact openings. For ease of illustration, this arrangement is not illustrated. In some embodiments, the bond pad layer 136 comprises a eutectic material, such as aluminum germanium (AlGe), aluminum copper (AlCu), silicon gold (SiAu), or some other eutectic material. A eutectic material is an alloy having a temperature where the constituents of the alloy melt and solidify at the same temperature.

Figure 6:
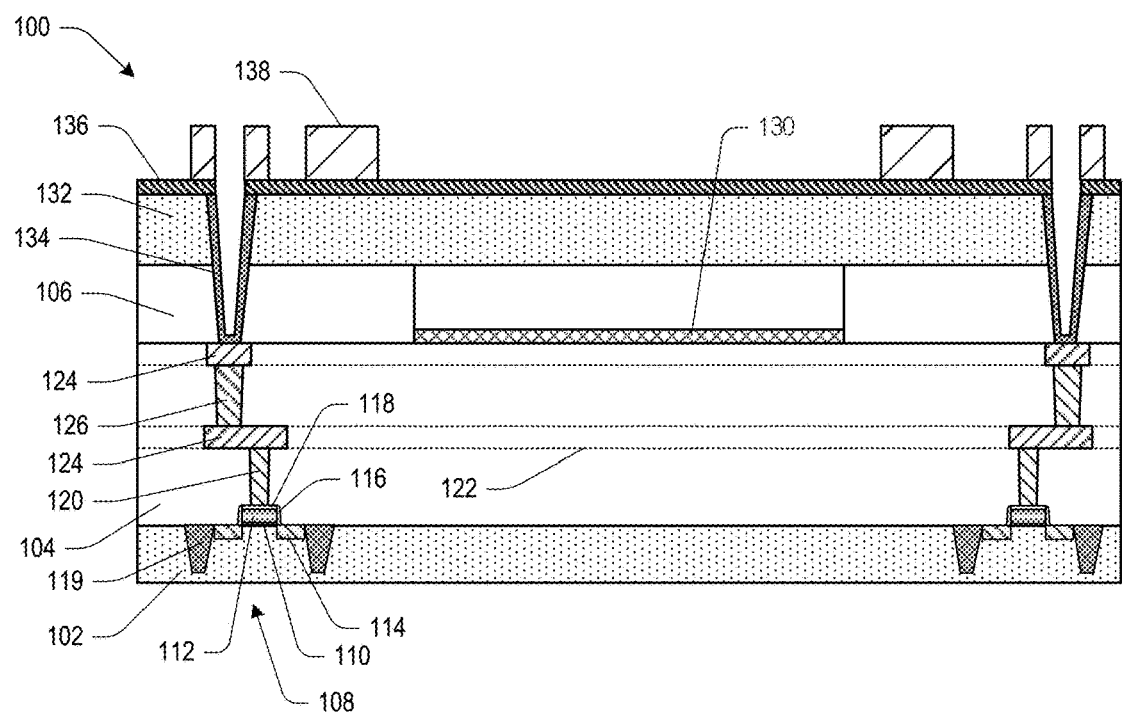

Referring to FIG. 6, a mask 138 is formed over the bond pad layer 136, in accordance with some embodiments. The mask 138 may comprise a plurality of individually formed layers that together define a mask stack. In some embodiments, the mask 138 comprises at least one of a hard mask layer, a bottom antireflective coating (BARC) layer, an organic planarization layer (OPL), or a photoresist layer. The hard mask layer is formed by at least one of PVD, CVD, spin on, growth, or other suitable techniques. In some embodiments, the hard mask layer comprises at least one of silicon (e.g., polycrystalline silicon), oxygen, nitrogen, or other suitable materials. In some embodiments, the BARC layer is a polymer layer that is applied using a spin coating process. In some embodiments, the OPL comprises a photo-sensitive organic polymer that is applied using a spin coating process. In some embodiments, the OPL comprises a dielectric layer. In some embodiments, the photoresist layer is formed by at least one of spinning, spray coating, or other suitable techniques. The photoresist is a negative photoresist or a positive photoresist. With respect to a negative photoresist, regions of the negative photoresist become insoluble when illuminated by a light source, such that application of a solvent to the negative photoresist during a subsequent development stage removes non-illuminated regions of the negative photoresist. A pattern formed in the negative photoresist is thus a negative image of a pattern defined by opaque regions of a template, such as a mask, between the light source and the negative photoresist. In a positive photoresist, illuminated regions of the positive photoresist become soluble and are removed via application of a solvent during development. Thus, a pattern formed in the positive photoresist is a positive image of opaque regions of the template, such as a mask, between the light source and the positive photoresist. One or more etchants have a selectivity such that the one or more etchants remove or etch away one or more layers exposed or not covered by the photoresist at a greater rate than the one or more etchants remove or etch away the photoresist. Accordingly, an opening in the photoresist allows the one or more etchants to form a corresponding opening in the one or more layers under the photoresist, and thereby transfer a pattern in the photoresist to the one or more layers under the photoresist. The photoresist is stripped or washed away after the pattern transfer. The layers of the mask stack are patterned to define the mask 138. In some embodiments, the photoresist layer is exposed using a radiation source and a reticle to define a pattern in the photoresist layer, and portions of the photoresist layer are removed to define a patterned photoresist layer. The underlying OPL, BARC layer, and hard mask layer are etched using the patterned photoresist layer as a template to form the mask 138 and expose portions of the bond pad layer 136 under the mask 138.

Figure 7:
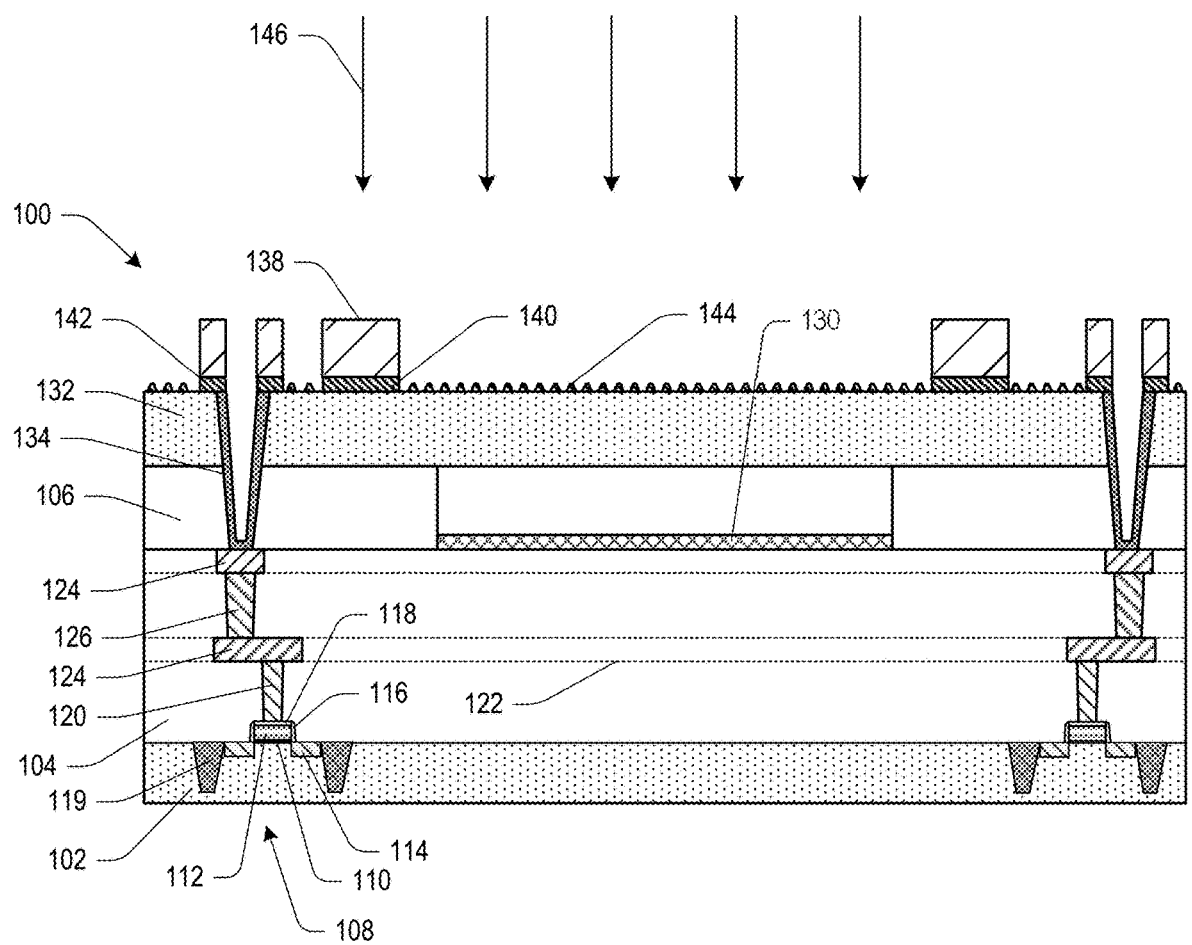

Referring to FIG. 7, the bond pad layer 136 is patterned using the mask 138 as a removal template to form a bond ring 140, contact pads 142, and anti-stiction dimples 144, in accordance with some embodiments. In some embodiments, an etch process 146 is performed to form the bond ring 140, the contact pads 142, and the anti-stiction dimples 144. The bond ring 140 may have any closed shape when viewed from above such as a circular shape, a rectangular shape, or some other shape. The etch process 146 may have different phases with different etch chemistries with varying power levels to affect the characteristics of the etch process 146. The bond ring 140 and contact pads 142 are formed from portions of the bond pad layer 136 protected from removal by the mask 138. The anti-stiction dimples 144 are formed by portions of the bond pad layer 136 that are removed during the etch process and re-deposited on uncovered surfaces of the semiconductor layer 132. The etch process 146 is controlled to provide a redepositing component, where a portion of the bond pad layer 136 is sputtered during the etch process 146 and deposits on the uncovered surfaces of the semiconductor layer 132 to form the anti-stiction dimples 144. For illustration purposes, the size of the anti-stiction dimples 144 is exaggerated. In some embodiments, a single process step patterns the bond pad layer 136 to define the bond ring 140 and also forms the anti-stiction dimples 144. The anti-stiction dimples 144 are formed of the same material as the bond pad layer 136, such as a eutectic material. The anti-stiction dimples 144 reduce the surface contact energy of the semiconductor layer 132. The use of a single step for forming the anti-stiction dimples 144 and the bond ring 140 reduces process complexity and cost.

Figure 7A:
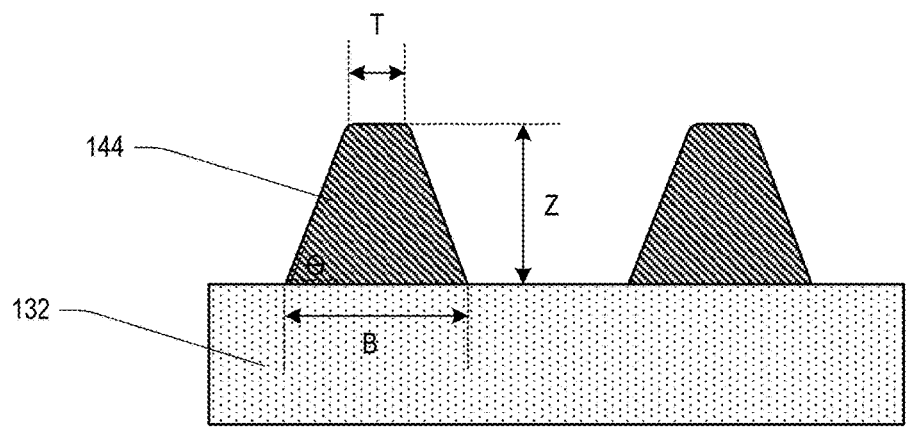
FIG. 7A illustrates an exploded view showing anti-stiction dimples of a semiconductor device, in accordance with some embodiments.

The anti-stiction dimples 144 may be randomly distributed on the uncovered surfaces of the semiconductor layer 132. Referring to FIG. 7A, an exploded view showing the anti-stiction dimples 144 is provided, in accordance with some embodiments. In some embodiments, the anti-stiction dimples 144 have a trapezoidal vertical cross-section. The corners of the anti-stiction dimples 144 may be rounded. The horizontal cross-section shape of the anti-stiction dimples 144 that contact the semiconductor layer 132 may be circular or polygonal, such as an oval, a triangle, a diamond, a pentagon, a hexagon, or some other shape. In some embodiments, a surface roughness of the portions of the semiconductor layer 132 covered by the anti-stiction dimples 144 is between about 7 nm and 12 nm, such as about 9.45 nm. The dimensions of the anti-stiction dimples 144 may be described as $B \geq T > 0$ and $\Theta > 0$.

Figure 8:
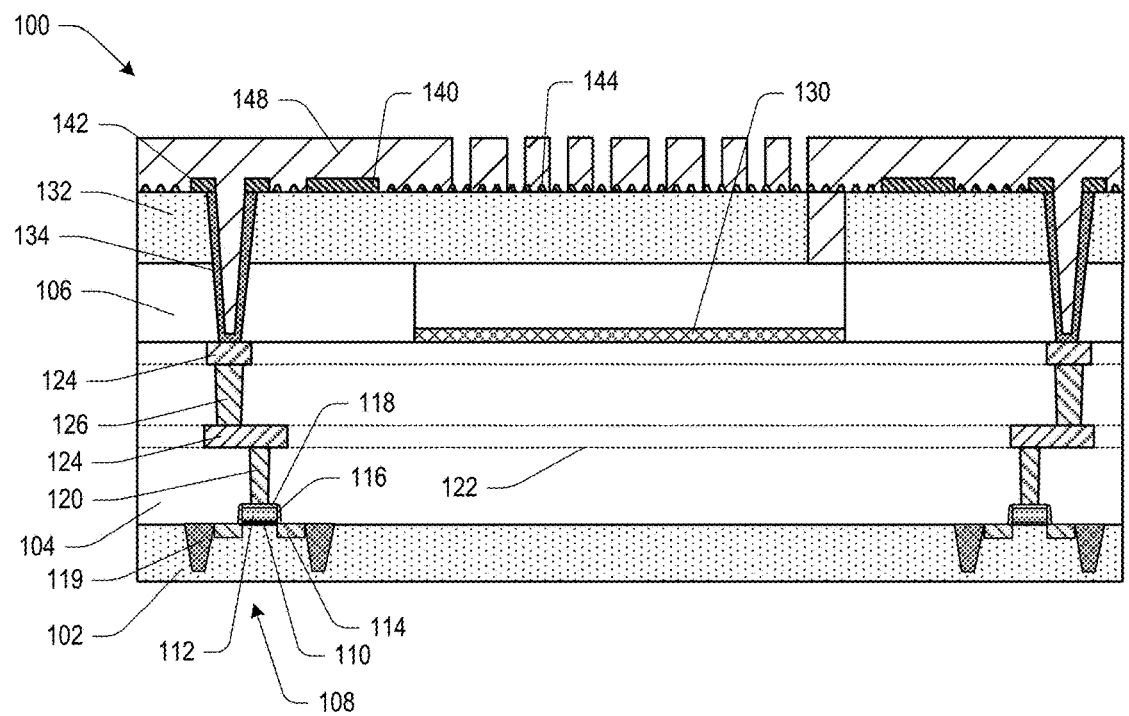
FIGS. 8-11 illustrate a semiconductor device at a stage of fabrication, in accordance with some embodiments.

Referring to FIG. 8, the mask 138 is removed and a mask 148 is formed over the semiconductor layer 132, the bond ring 140, the contact pads 142, and the anti-stiction dimples 144, in accordance with some embodiments. The mask 148 may be a photoresist mask or a stack of mask layers including at least one of a hard mask layer, a BARC layer, an OPL, or a photoresist layer comprising materials and formed as described herein.

Figure 9:
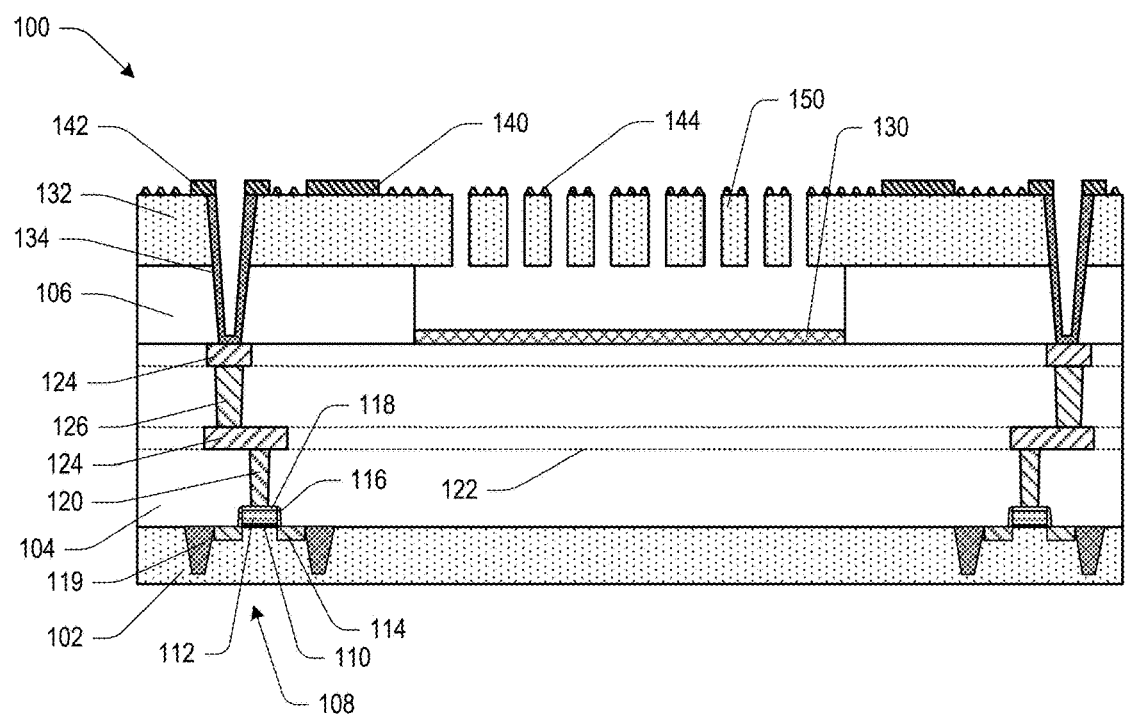

Referring to FIG. 9, the semiconductor layer 132 is patterned using the mask 148 as a removal template to form MEMS elements 150 and the mask 148 is removed, in accordance with some embodiments. In some embodiments, an etch process is performed to form the MEMS elements 150. The anti-stiction dimples 144 remain on upper surfaces of the MEMS elements 150.

Figure 10:
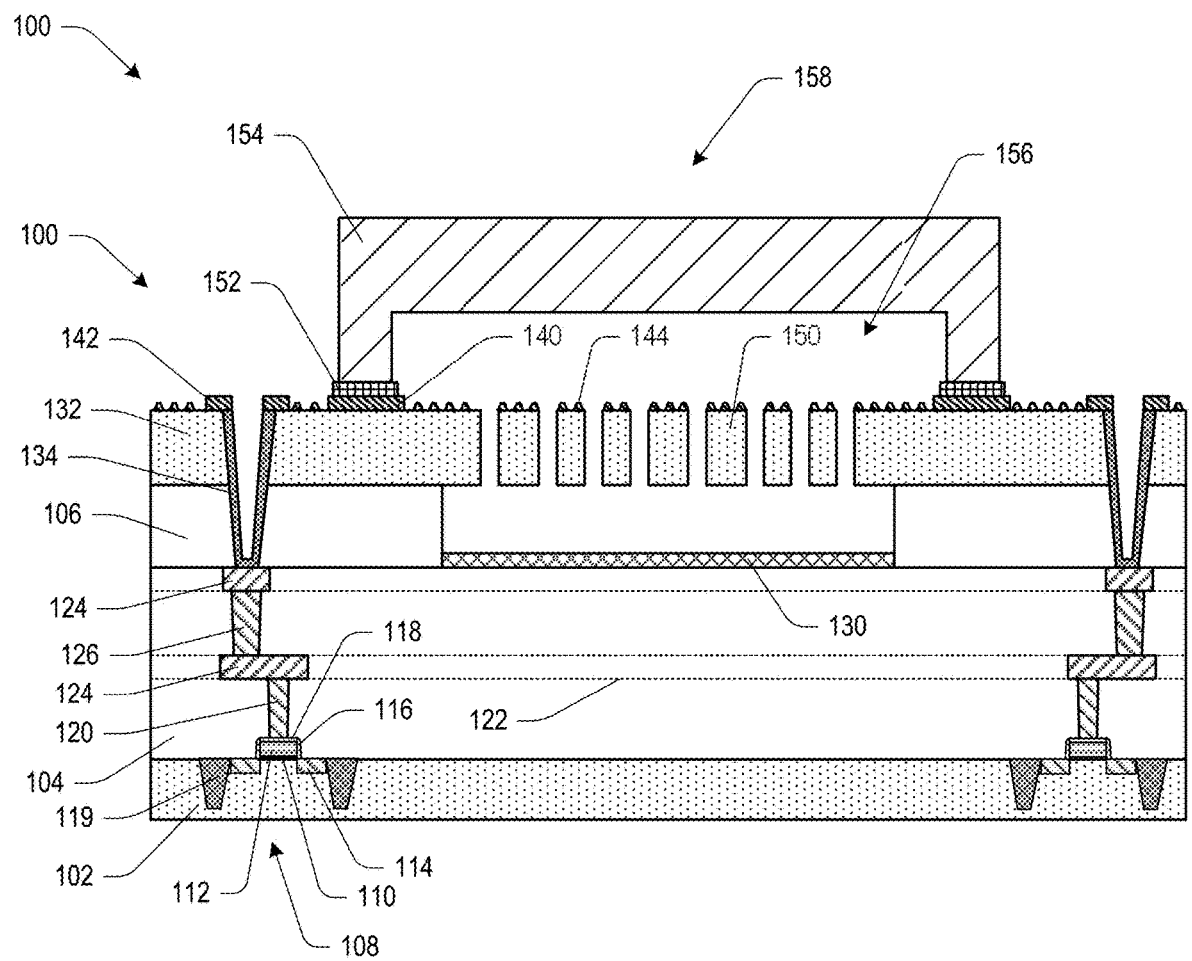

Referring to FIG. 10, a bond layer 152 is formed over the bond ring 140 and a cap structure 154 is formed over the MEMS elements and contacting the bond layer 152, in accordance with some embodiments. The bond layer 152 may comprise germanium. In some embodiments, the cap structure 154 is formed by bonding a cap wafer patterned with features for the cap structure 154 to the bond layer 152 and removing portions of the cap wafer, such as by performing a grinding process to define the cap structure 154. The cap structure 154 defines a sealed cavity 156 for the MEMS elements 150 to define a MEMS device 158. The conductive layer 130 may be used to detect changes in capacitance resulting from movements of the MEMS elements 150. The cap wafer may be a complementary metal-oxide-semiconductor (CMOS) wafer, which may or may not have electrical circuits (not shown) formed thereon. The cap wafer may include various active devices such as transistors, capacitors, resistors, diodes, photodiodes, fuses, and the like. The electrical circuits may be interconnected to perform one or more functions suitable for a particular application, which may or may not be related to the MEMS elements 150. In some embodiments, the cap wafer has a substrate may include dielectric layers, conductive lines and vias for electrical routing, or other features. In some embodiments, a removal process may be performed to remove the anti-stiction dimples 144 outside the cavity 156.

Figure 11:
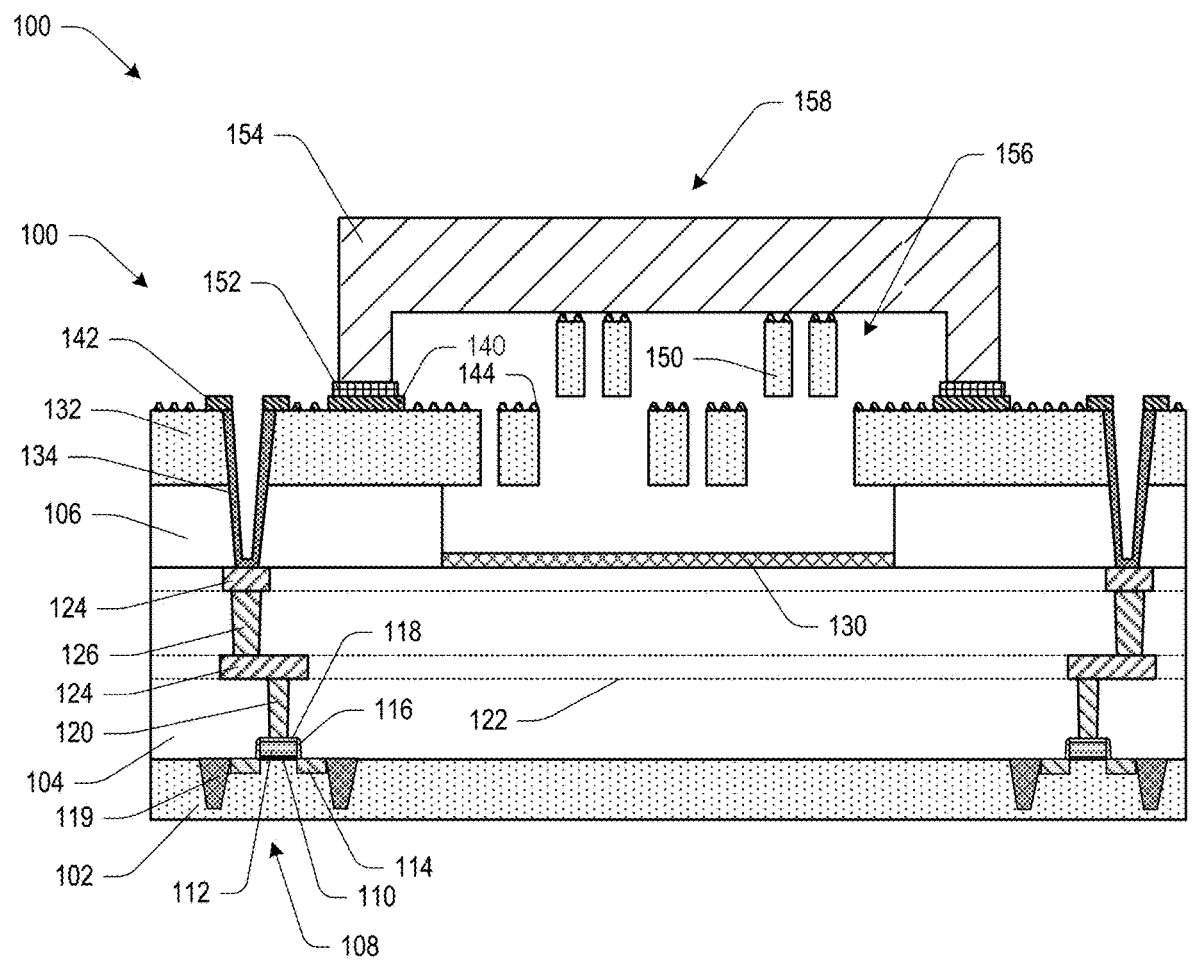

Referring to FIG. 11, some of the MEMS elements 150 may move within the cavity 156 to perform the sensing function of the semiconductor structure 100. In some cases, the moving MEMS elements 150 may contact a surface of the cap structure 154. The increased surface roughness, such as a surface roughness greater than 7 nm, provided by the anti-stiction dimples 144 reduces the likelihood that one of the MEMS elements 50 will adhere to the cap structure 154, thus reducing the possibility of damaging the sensing ability of the MEMS device 158. The use of a single process step patterns the bond pad layer 136 and forms the anti-stiction dimples 144 on the moving MEMS elements 150 to reduce the likelihood of the moving MEMS elements 150 sticking to the cap structure 154 and also forms the bond ring 140 for bonding to the cap structure 154. The use of the single process step reduces process complexity and cost, thereby increasing throughput and profitability.

In some embodiments, a semiconductor device is provided. The semiconductor device includes a semiconductor layer, a micro-electromechanical systems (MEMS) structure defined in the semiconductor layer, a bond ring over the semiconductor layer, and a cap structure over the MEMS structure and bonded to the bond ring. The MEMS structure has an upper surface and the cap structure has a lower surface facing the upper surface of the MEMS structure. Dimples of eutectic material are on the upper surface of the MEMS structure.

In some embodiments, a semiconductor structure includes a semiconductor layer, a movable element of a micro-electromechanical systems (MEMS) structure defined in the semiconductor layer, and a cap structure over the movable element of the MEMS structure. The movable element has an upper surface and the cap structure has a lower surface facing the upper surface of the movable element. A surface roughness of the upper surface of the movable element is at least 7 nm.

In some embodiments, a method for forming a semiconductor structure is provided. The method includes forming a micro-electromechanical systems (MEMS) structure in a semiconductor layer. Dimples of a eutectic material are formed on an upper surface of the MEMS structure. A bond ring of eutectic material is formed over the semiconductor layer and adjacent the MEMS structure. A cap structure attached to the bond ring and over the MEMS structure is formed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A semiconductor structure, comprising:
   a semiconductor layer;
   a micro-electromechanical systems (MEMS) structure defined in the semiconductor layer;
   a bond ring over the semiconductor layer; and
   a cap structure over the MEMS structure and bonded to the bond ring, wherein:
     the MEMS structure has an upper surface;
     the cap structure has a lower surface facing the upper surface of the MEMS structure; and
     dimples of eutectic material are on the upper surface of the MEMS structure.

2. The semiconductor structure of claim 1, wherein the MEMS structure comprises movable elements.

3. The semiconductor structure of claim 1, wherein:
   the eutectic material comprises one of aluminum copper, aluminum germanium, or silicon gold.

4. The semiconductor structure of claim 1, wherein:
   the dimples have a trapezoidal vertical cross section.

5. The semiconductor structure of claim 1, wherein:
   a surface roughness of the MEMS structure with the dimples is at least about 7 nm.

6. The semiconductor structure of claim 1, wherein:
   the bond ring comprises the eutectic material.

7. The semiconductor structure of claim 1, wherein:
   the bond ring comprises a layer of germanium over the eutectic material.

8. A semiconductor structure, comprising:
   a semiconductor layer;
   a movable element of a micro-electromechanical systems (MEMS) structure defined in the semiconductor layer; and
   a cap structure over the movable element of the MEMS structure, wherein:
     the movable element has an upper surface;
     the cap structure has a lower surface facing the upper surface of the movable element;
     a surface roughness of the upper surface of the movable element is at least 7 nm; and
     the upper surface of the movable element comprises dimples of eutectic material.

9. The semiconductor structure of claim 8, wherein:
   the eutectic material comprises one of aluminum copper, aluminum germanium, or silicon gold.

10. The semiconductor structure of claim 8, wherein:
    the dimples have a trapezoidal vertical cross section.

11. The semiconductor structure of claim 8, comprising:
    a bond ring over the semiconductor layer, wherein:
      the cap structure is bonded to the bond ring; and
      the bond ring comprises the eutectic material.

12. The semiconductor structure of claim 11, wherein:
    the bond ring comprises a layer of germanium over the eutectic material.

13. A method for forming a semiconductor structure, comprising:
    forming a micro-electromechanical systems (MEMS) structure in a semiconductor layer;
    forming dimples of a eutectic material on an upper surface of the MEMS structure;
    forming a bond ring of the eutectic material over the semiconductor layer and adjacent the MEMS structure; and
    forming a cap structure attached to the bond ring and over the MEMS structure.

14. The method of claim 13, wherein:
    forming the MEMS structure comprises forming movable elements.

15. The method of claim 13, wherein:
    forming the dimples of the eutectic material comprises forming the dimples of one of aluminum copper, aluminum germanium, or silicon gold.

16. The method of claim 13, wherein forming the MEMS structure comprises:
    forming a bond pad layer over the semiconductor layer;
    forming a first mask over the bond pad layer; and
    removing portions of the bond pad layer not covered by the first mask to define the bond ring, wherein material from the removed portions of the bond pad layer redeposits on the semiconductor layer to define the dimples.

17. The method of claim 16, comprising:
    forming a second mask over the semiconductor layer, the bond ring, and the dimples;
    etching the semiconductor layer using the second mask as a removal template to define the MEMS structure; and
    removing the second mask, wherein:
      the dimples remain on the upper surface of the MEMS structure.

18. The method of claim 13, wherein:
    forming the dimples comprises forming the dimples to provide a surface roughness on the upper surface of at least about 7 nm.

19. The method of claim 13, comprising:
    forming a layer of germanium over the bond ring prior to forming the cap structure attached to the bond ring.

20. The method of claim 13, wherein:
    forming the dimples comprises forming the dimples to have a trapezoidal vertical cross section.

* * * * *